United States Patent
Sundaram et al.

(10) Patent No.: US 10,121,494 B1
(45) Date of Patent: Nov. 6, 2018

(54) USER PRESENCE DETECTION

(71) Applicant: Amazon Technologies, Inc., Seattle, WA (US)

(72) Inventors: Shiva Kumar Sundaram, Fremont, CA (US); Chao Wang, Newton, MA (US); Shiv Naga Prasad Vitaladevuni, Cambridge, MA (US); Spyridon Matsoukas, Hopkinton, MA (US); Arindam Mandal, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/474,603

(22) Filed: Mar. 30, 2017

(51) Int. Cl.
| | |
|---|---|
| G10L 15/00 | (2013.01) |
| G10L 25/78 | (2013.01) |
| G10L 15/16 | (2006.01) |
| G10L 15/30 | (2013.01) |
| G10L 15/02 | (2006.01) |
| G10L 15/22 | (2006.01) |
| G10L 15/08 | (2006.01) |

(52) U.S. Cl.
CPC .............. *G10L 25/78* (2013.01); *G10L 15/02* (2013.01); *G10L 15/16* (2013.01); *G10L 15/22* (2013.01); *G10L 15/30* (2013.01); *G10L 2015/088* (2013.01); *G10L 2025/783* (2013.01)

(58) Field of Classification Search
CPC ......... G10L 17/26; G10L 15/20; H04L 67/24; H04M 3/50
USPC ....................................................... 704/233
See application file for complete search history.

(56) References Cited

U.S. PATENT DOCUMENTS

| | | | | |
|---|---|---|---|---|
| 9,111,542 B1* | 8/2015 | Hart | .................. | G10L 21/00 |
| 2006/0245558 A1* | 11/2006 | Gatzke | .............. | H04M 3/42374 |
| | | | | 379/88.16 |
| 2008/0242231 A1* | 10/2008 | Gray | ................ | H04M 1/72563 |
| | | | | 455/66.1 |
| 2008/0260169 A1* | 10/2008 | Reuss | ...................... | H04R 1/10 |
| | | | | 381/58 |
| 2008/0261630 A1* | 10/2008 | Wormald | .......... | H04M 1/72552 |
| | | | | 455/466 |
| 2012/0010890 A1* | 1/2012 | Koverzin | .......... | H04W 52/0216 |
| | | | | 704/275 |
| 2014/0236582 A1* | 8/2014 | Raychowdhury | ....... | G10L 25/84 |
| | | | | 704/205 |
| 2014/0366050 A1* | 12/2014 | Hatambeiki | ..... | H04N 21/44204 |
| | | | | 725/12 |
| 2016/0307413 A1* | 10/2016 | Rafii | ........................ | G08B 3/10 |

(Continued)

*Primary Examiner* — Daniel Abebe
(74) *Attorney, Agent, or Firm* — Pierce Atwood LLP

(57) ABSTRACT

A speech-capture device can capture audio data during wakeword monitoring and use the audio data to determine if a user is present nearby the device, even if no wakeword is spoken. Audio such as speech, human originating sounds (e.g., coughing, sneezing), or other human related noises (e.g., footsteps, doors closing) can be used to detect audio. Audio frames are individually scored as to whether a human presence is detected in the particular audio frames. The scores are then smoothed relative to nearby frames to create a decision for a particular frame. Presence information can then be sent according to a periodic schedule to a remote device to create a presence "heartbeat" that regularly identifies whether a user is detected proximate to a speech-capture device.

31 Claims, 12 Drawing Sheets

(56) References Cited

U.S. PATENT DOCUMENTS

2016/0379456 A1* 12/2016 Nongpiur ........... G08B 13/1672
340/541
2017/0245125 A1* 8/2017 Child ...................... H04W 4/12
2017/0265001 A1* 9/2017 Lombardi ........... H04L 12/2838

* cited by examiner

USER PRESENCE DETECTION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
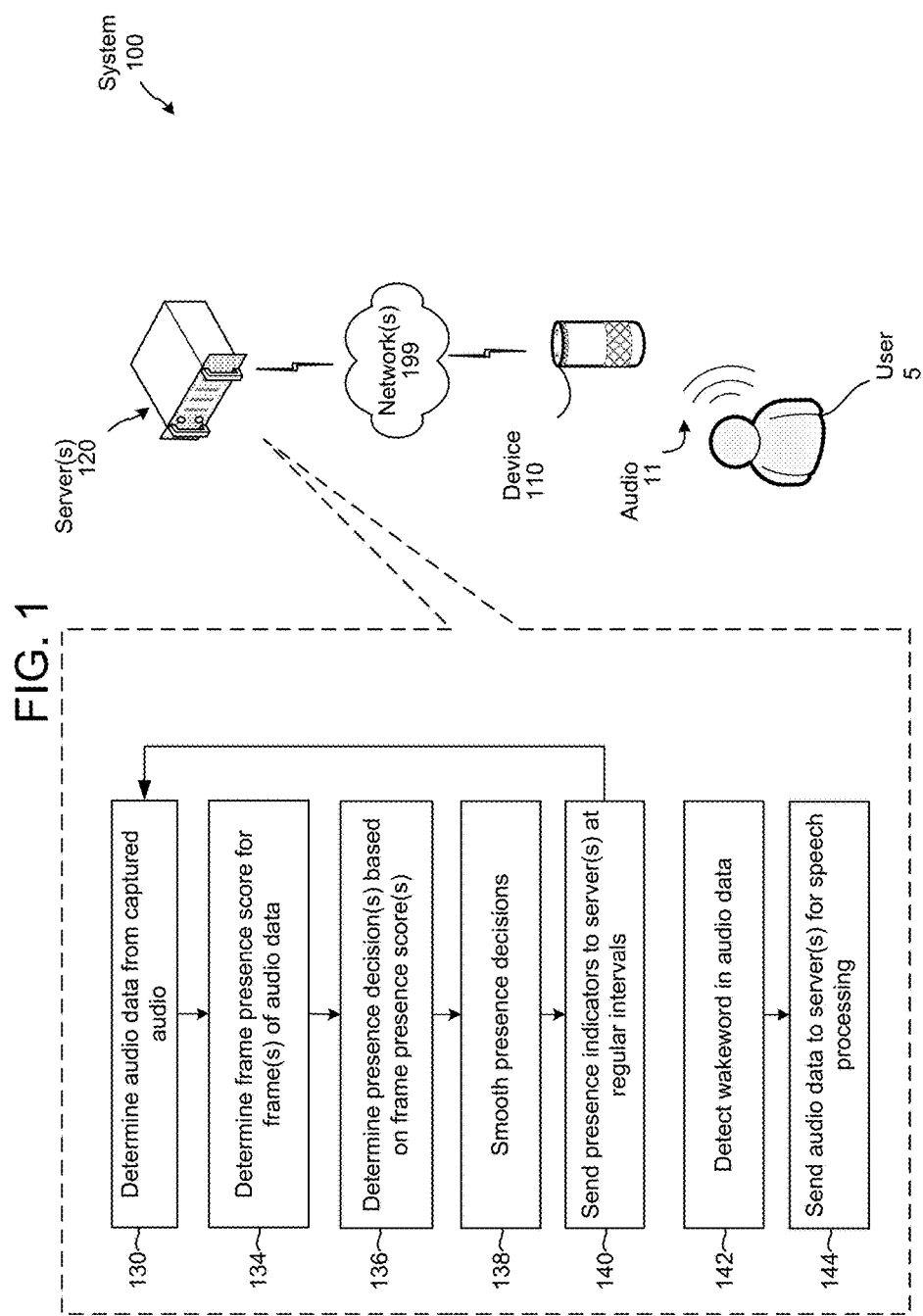
FIG. 1 illustrates a speech processing system configured to determine periodic user presence data according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

A speech processing system may be configured as a relatively self-contained system where one device captures audio, performs speech processing, and executes a command corresponding to the input speech. Alternatively, a speech processing system may be configured as a distributed system where a number of different devices combine to capture audio of a spoken utterance, perform speech processing, and execute a command corresponding to the utterance. In a distributed system, one device may capture audio while other device(s) perform speech processing, etc. Further, other devices may coordinate communication between local devices (e.g., devices nearby to users) to allow users to communicate with each other using speech controlled devices.

Speech processing system may employ local devices that are speech controlled, and thus may be activated by speaking a specific command, such as a wakeword, to activate further speech capture and/or speech processing. In order to use a wakeword, a device may be configured for "always on" operation, where the device is continually detecting audio but only sending audio data for processing/performing other operations, if the wakeword is detected. Such always on operation may be configured for a device that may, for example, reside in a user's home, office or other environment where it is plugged into a wall outlet and typically does not move while in operation.

Various aspects of operation of such a system, including communication using speech controlled devices, may benefit from some indication as to whether a user is located nearby a local device. For example, if a one user is attempting to make a call to another, if the system knows that the call recipient's device does not detect a user nearby the system may offer a message such as "The person you are attempting to contact is not near their device. Would you like to try later?" Or, if the various users request such information be exchanged, the system may affirmatively offer one user presence information regarding another user such as "The person you tried calling an hour ago is now in front of her device. Would you like to try calling her now?" Other such operations may take place if a system has knowledge of when a user is present with respect to a device, especially when the device is capable of being controlled through a far field voice interface and is plugged into a wall outlet or other type of stationary power supply.

User presence detection may take a number of different forms. In certain configurations, image data from one or more cameras may be analyzed using computer vision (CV) techniques to determine if a user is located nearby to a device. In other configurations, audio data may be analyzed to determine if speech or other user-initiated sounds (e.g., doors being closed, footsteps, coughing, etc.) are be detected. In other configurations, touch data or other signals (such as Bluetooth signals from a user's telephone) may be used to indicate a user presence. In other configurations, various combinations of the above and/or other data may be used.

Certain systems only operate to detect a user presence if a request is made to inquire into whether a user is present, for example if a system receives a call request or other query as to whether a user is present. It may be beneficial for a system to have presence information available to it prior to receiving such a request. It may also be beneficial for a device to only engage in certain operations if a user is present (for example displaying user indications or the like). Further, to avoid uncertainty that may be caused by rapid fluctuation with presence information, a system may smooth presence data and only update the presence data when a certain threshold of time has been reached.

Offered is a system where a largely stationary local device or devices, that are situated in an environment where a user may be present (e.g., a home, office, etc.) may be configured to determine whether a user is present based on audio data detected by the device(s). The local device, which may be a speech-capture device that is configured to capture user speech and send it to a remote device for speech processing, may be configured with various speech-processing component such as a wakeword detector. The device, while in a wakeword detection (e.g., always on) mode may use the audio data that is processed by a wakeword detected to perform presence detection. Using the results of the presence detection the device may update a remote device (such as a server or other system component) as to whether a user is present near the speech-capture device. The speech-capture device may regularly update the remote device as to user presence, thus establishing a "heartbeat" of user presence that is updated as needed when a user enters/leaves an environment. Thus, requests to the remote device for user presence information may be up-to-date, without the need to make a user presence request to a particular local device.

FIG. 1 shows a speech processing system 100 capable of performing presence detection as described herein. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more speech-controlled devices 110 local to user 5, as well as one or more networks 199 and one or more servers 120 connected to speech-controlled device(s) 110 across network(s) 199. The server(s) 120 (which may be one or more different physical devices) may be capable of performing traditional speech processing (e.g., ASR, NLU, command processing, etc.) or other operations as described herein. A single server 120 may perform all speech processing or multiple servers 120 may combine to perform all speech processing. Further, the server(s) 120 may execute certain commands, such as answering spoken utterances of the users 5, operating other devices (light switches, appliances, etc.). In addition, certain speech detection or command execution functions may be performed by the speech-controlled device 110. Further, the system may be in communication with external data sources, such as a knowledge base, external service provider devices, or the like.

In one example, as shown in FIG. 1, a speech-capture device 110 may capture audio of a spoken utterance (i.e., audio 11) from user 5 (or other sources) via one or more microphones of the first speech-capture device 110b. The speech-capture device 110 may determine (130) audio data from the captured audio. The device 100 may then determine (134) frame presence scores for individual frames of audio data. The device 100 may then determine (136) presence decisions based on the frame presence score(s). The device 100 may smooth (138) the presence decision to avoid rapid fluctuations in presence data and then may send (140) presence indicators to the server(s) 120 at regular intervals based on the new audio/frame decisions determined in steps 130-138. The device may then detect (142) a wakeword represented in the audio data and send (144) audio data representing speech to the server(s) 120 for speech processing.

Figure 2:
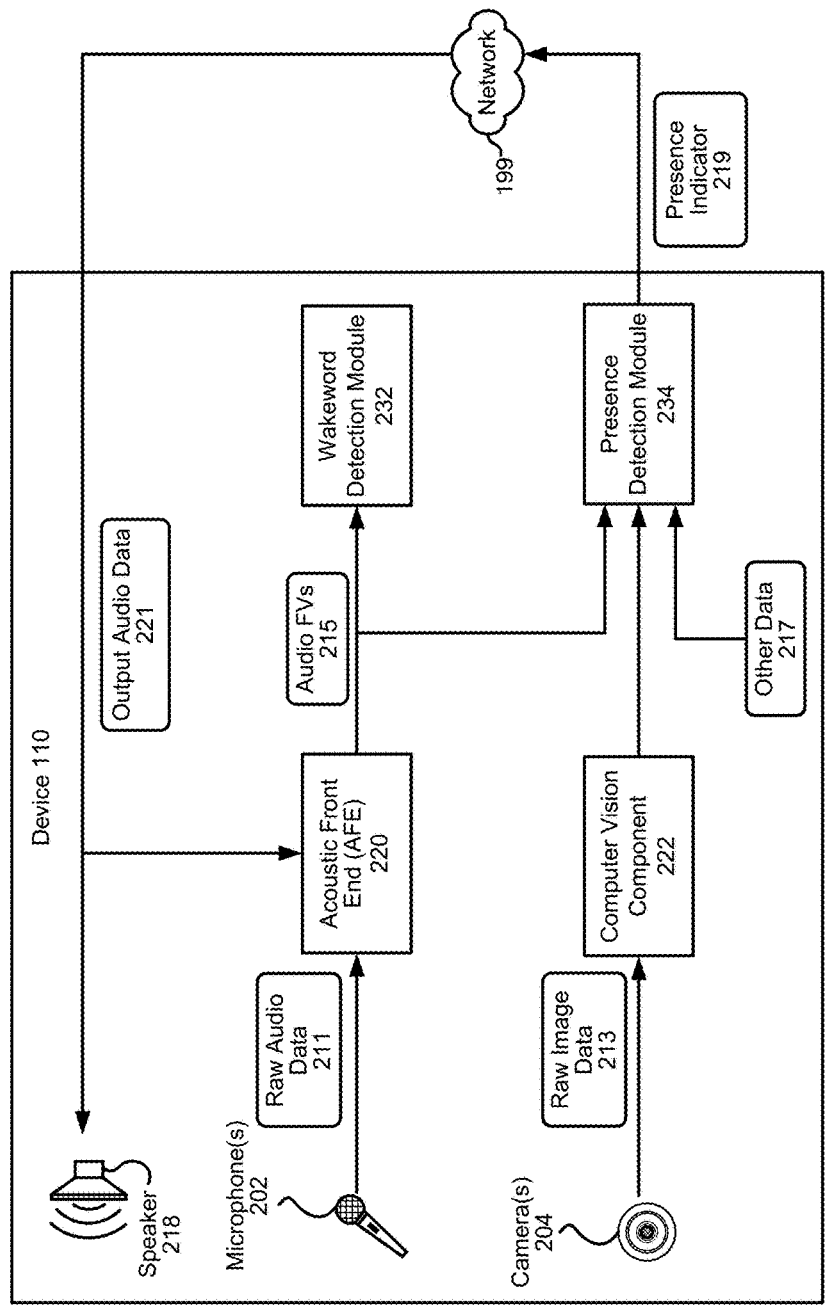
FIG. 2 illustrates processing of data related to presence detection by a device according to embodiments of the present disclosure.

A device 110 may operate using components and data illustrated in FIG. 2. As shown, one or more microphones 202 may detect audio in the presence of a device and may send raw audio data 211 to an acoustic front end (AFE) 220. The AFE 220 may transform the audio data 211 (for example, a single-channel, 16-bit audio stream sampled at 16 kHz), captured by the microphone 202, into audio feature vectors 215 that may ultimately be used for processing by various components, such as a wakeword detection module 232, presence detection module 234, speech recognition engine 958 (discussed below) or other components. The AFE 220 may reduce noise in the raw audio data 211. The AFE 220 may also perform acoustic echo cancellation (AEC) or other operations to account for output audio data 221 that may be sent to a speaker 218 of the device 110 for output. For example, the device 110 may be playing music or other audio that is being received over the network 199 in the form of output audio data 221. To avoid the output audio interfering with the device's ability to detect and process input audio, the AFE 220 or other component may perform echo cancellation to remove the output audio data 221 from the input raw audio data 211, or other operations.

The AFE 220 may divide the audio data into frames representing time intervals for which the AFE 220 determines a number of values (i.e., features) representing qualities of the audio data 211, along with a set of those values (i.e., a feature vector or audio feature vector) representing features/qualities of the audio data 211 within each frame. A frame may be a certain period of time, for example a sliding window of 25 ms of audio data taken every 10 ms, or the like. Many different features may be determined, as known in the art, and each feature represents some quality of the audio that may be useful for ASR processing, wakeword detection, presence detection, or other operations. A number of approaches may be used by the AFE 220 to process the audio data 211, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 215 (or the raw audio data 211) may be input into a wakeword detection module 232 that is configured to detect keywords spoken in the audio 11. The wakeword detection module 232 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 232 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 232 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another embodiment the wakeword spotting system may be built on deep neural network (DNN)/recursive neural network (RNN) structures directly, without MINI involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 (which may include audio feature vectors 215) corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending.

The audio data (either in its raw form 211 or in the form of the audio feature vectors 215) will also be sent to the presence detection module 234. Presence detection may happen in parallel to, and separate from, wakeword detection. That is, a wakeword need not be detected in audio for presence to be detected. The presence detection module 234 may analyze the audio data to determine if it represents sounds corresponding to a human presence. Those sounds may include speech but may also include non-speech sounds such as human generated sounds like coughing, sneezing, or the like. Other sounds that correspond to a human presence may include sounds resulting from human activity such as footsteps, doors opening or closing, appliances being operated, or the like. If the device 110 is equipped with a camera 204 (or is otherwise connected to a camera or computer vision components) the device 110 may capture raw image data 213 from one or more cameras 204 and may process the image data using a computer vision component 222 that is configured to process the image data and potentially determine if a human is present. The image data 213 may be time stamped or otherwise coordinated with audio data 211 and/or feature vectors 215 so the device 110 can match image data from a certain time to audio data also of the same time. The computer vision component 222 can send indications of user presence or other data to the presence detection module 234. The computer vision component 222 may operate using one or more trained machine learning models configured to use computer vision techniques to analyze video data to determine if a human is present.

The presence detection module 234 may also operate on other data 217 such as wireless signals that may be detected from mobile devices associated with a user, touch information (for example a touch on a display 1020 of a device 110 may assist in detecting a presence of a user), information from other sensors (such as a heat sensor, proximity sensor), information from other devices (for example an appliance in the same room as device 110 detecting user operation may assist in detecting presence of a user) or the like. The other data 217 may be time aligned with video data and/or audio data.

The presence detection module 234 may operate using one or more one or more trained machine learning models configured to determine whether a user is present based on the various input data. The presence detection module 234 may then output a presence indicator 219 which indicates whether a user is detected in the environment of the device 110. The presence indicator 219 may be updated periodically during regular time intervals (e.g., every 15 second, 30 seconds, 1 minute, etc.). The length between the time intervals is configurable and may be a preconfigured time interval (e.g., determined by a component of the system prior to the device capturing and processing audio data involved in the particular presence detection event). The time interval may also be adjusted during system operation. For example, the time interval may depend on audio conditions, for example updating less (or more) frequently under noisy conditions. The time interval may also depend on other user information, such as updating more frequently when a user's mobile device's location sensor (e.g., GPS) indicates the user is at a location of the device 110 but updating less frequently if the user is out of town. The time interval may also change under various other conditions. The device 110 may send the presence indicator 219 over the network 199 to another device, for example server 120, for purposes of notifying another component of the system regarding user presence proximate to the device 110.

Figure 3:
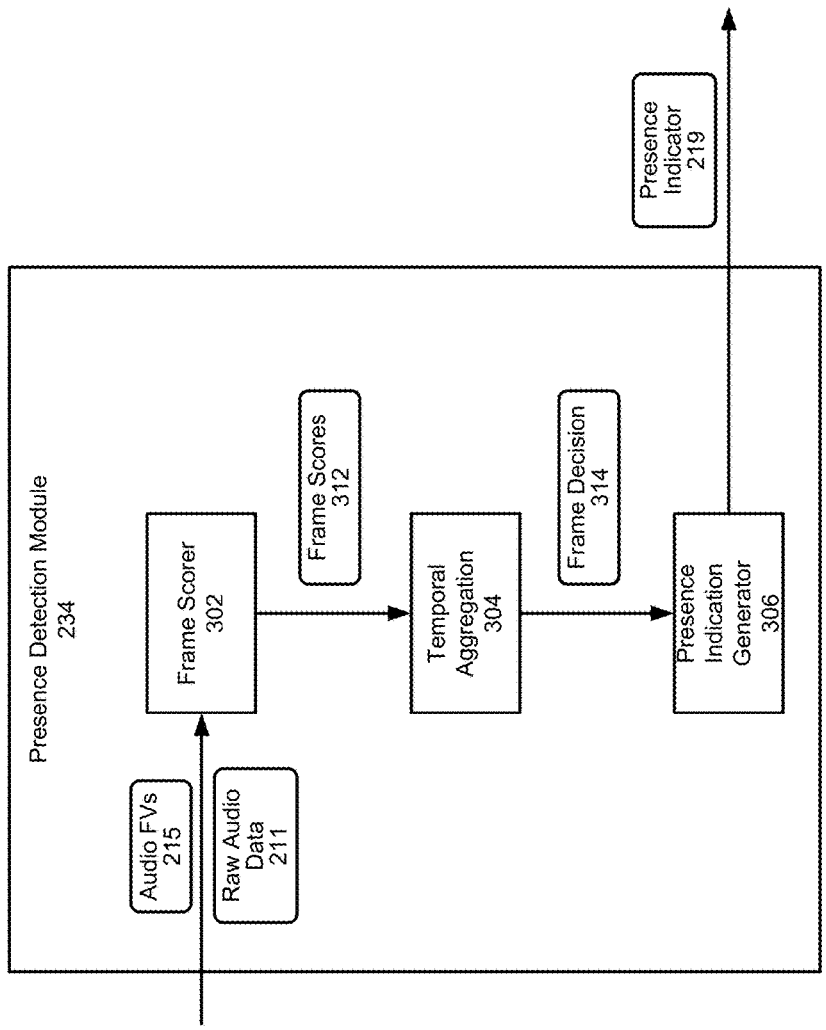
FIG. 3 illustrates processing of data related to presence detection by a device according to embodiments of the present disclosure.

In particular, the presence detection module 234 may use one or more models to analyze the audio data to determine if a user is present. As shown in FIG. 3, the presence detection module 234 may include a number of components to process and analyze the audio data. Audio data, such as feature vectors 215, and/or raw audio data 211 may be input into a frame scorer 302 which may operate a trained model using machine learning techniques (such as a DNN sound classifier) to score particular audio data as likely corresponding to human presence or not. For example, the frame scorer 302 may process a feature vector 215 representing a frame's worth of audio data and create a score 312 representing a probability that the frame corresponds to user presence. The score 312 may be a binary indicator (for example, 0 for no human detected, 1 for human detected) or may be a different value indicating a probability or likelihood of human presence. The scores may be passed to a temporal aggregation component 304 which may operate a trained model using machine learning techniques to determine whether an incoming frame level score is sufficient to decide whether the frame should be classified as human detected YES or human detected NO, represented by frame decision 314. In making a decision for a particular frame, the temporal aggregation component 304 may consider the score 312 from the individual frame as well as potentially scores from other frames (e.g., a certain number of frames coming before or after) as well as reference frame-level scores to align the output of the temporal aggregation component 304.

Figure 4:
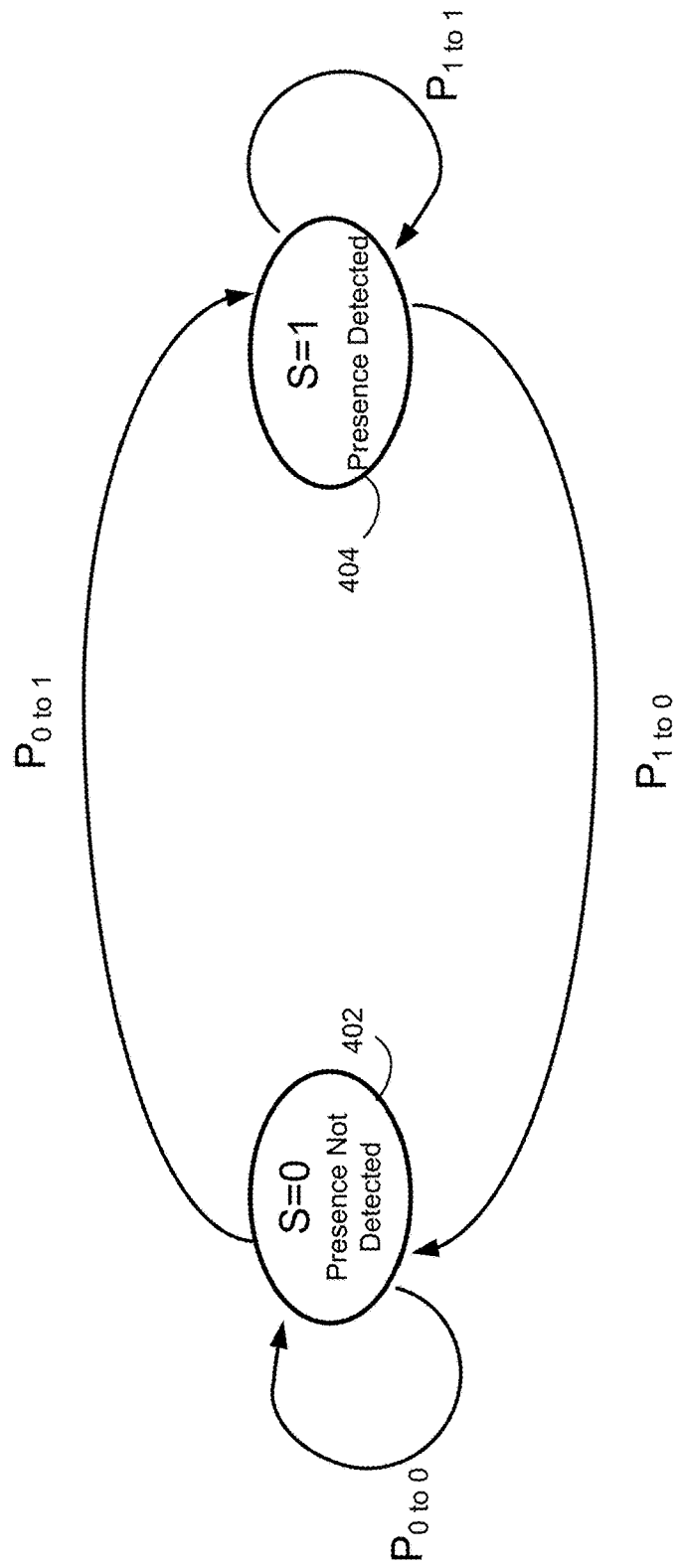
FIG. 4 illustrates determining presence detection by a device according to embodiments of the present disclosure.

The temporal aggregation component 304 may operate an HMM to alternate states between human detected YES and human detected NO. One example of such operation is the state machine approach illustrated in FIG. 4. As shown in 4, state S=0 402 corresponds to no human presence detected while state S=1 404 corresponds to human presence detected. The probability of staying at state 0 is indicated as $P_{0\ to\ 0}$. The device will stay at state 0 (for example when going from frame t to frame t+1) as represented by $S_{t+1}=P_t^*(1-a)+f_t^*a$ where $f_t$ is the frame level score 312 for frame t, a is a configurable attack rate (e.g., a factor representing how quickly the system should transition from no presence detected to presence detected), and $P_t$ represents a weighted sum/cumulated version of $f_t$. $P_t$ may be set to an initial value (e.g., 1) and then may decay based on the formula for $P_{t+1}$ shown below. The device will state at state 0 if $P_t^*(1-a)+f_t^*a<T_{0to1}$ where $T_{0to1}$ represents a configurable score threshold for transitioning from state 0 to state 1. Otherwise, the device will transition from state 0 to state 1 (e.g., $P_{t+1}=1$, shown as $P_{0\ to\ 1}$) if $P_t^*(1-a)+f_t^*a \geq T_{0to1}$.

The device will stay at state 1 (shown as $P_{1\ to\ 1}$) as represented by $P_{t+1}=P_t^*r\ f_t^*(1-r)$ where r is a configurable release rate (e.g., a factor representing how quickly the system should transition from presence detected to no presence detected). The device will stay at state 1 if $P_t^*r+f_t^*(1-r)>T_{1to0}$ where $T_{1to0}$ represents a configurable score threshold for transitioning from state 1 to state 0. Otherwise the device will transition from state 1 to state 0 (e.g., $P_{t+1}=0$, shown as $P_{1\ to\ 0}$) if $P_t^*r+f_t^*(1-r) \leq T_{1to0}$. Thresholds $T_{0to1}$ and $T_{1to0}$ and may be different, or may be the same.

While the decision 314 is described as a frame decision, a decision may be made on groups of frames rather than (or in addition to) individual frames. Certain frames may be grouped and analyzed to decide whether the frames correspond to human presence being detected. Further, a classifier may be used to determine a presence decision for a frame or group of frames.

The temporal aggregation component 304 may apply certain smoothing to avoid rapid changes in the frame decision 314 (e.g., rapid state transitions). Such smoothing may account for natural pauses or breaks in audio that may not necessarily indicate a change in whether a human is present. For example, if the system detects coughing, then detects a momentary silence, then detects coughing again, the frames during the silence may correspond to scores 312 corresponding to no presence detected even if the human who was coughing is still in the vicinity of the device. To account for such audio fluctuations the temporal aggregation component 304 may wait to change a state (e.g., a frame decision 314) until a certain minimum number of frames are seen that have scores on the same side of the threshold. This minimum may be configured and may be different depending on which side of which threshold the frames appear. This approach is illustrated in FIG. 5.

Figure 5:
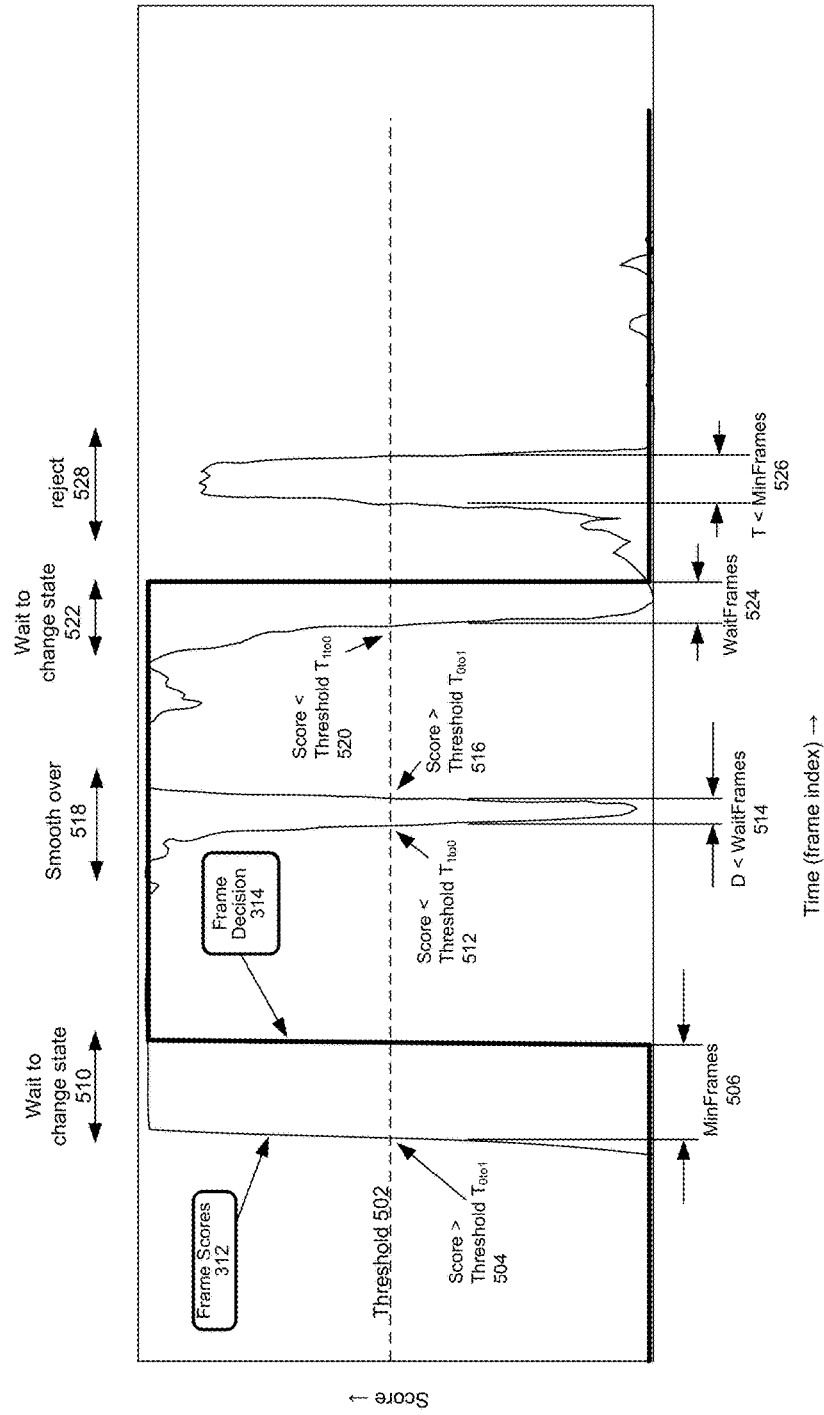
FIG. 5 illustrates determining presence detection by a device according to embodiments of the present disclosure.

As shown in FIG. 5, frame scores 312 are represented by the thin line graphed between score on the Y axis and time (e.g., frame index) on the X axis. For purposes of illustration thresholds $T_{0to1}$ and $T_{1to0}$ are shown to be the same and are illustrated as line 502. Initially, frame scores 312 are low, but then rise and initially cross the threshold at point 504. The temporal aggregation component 304, however, does not change the frame decision 314, however, until a certain number of frames with a high score are determined. As shown, MinFrames represents the minimum number of frames to wait before changing the decision from 0 to 1. The temporal aggregation component 304 therefore waits (510) until MinFrames (506) number of frames are determined above the score threshold, at which point the frame decision 314 changes from 0 (no presence detected) to 1 (presence detected).

As frames continue to be analyzed, their scores 312 are high and the frame decision 314 does not change. At point 512 the scores 312 drop below the score threshold 502, but the temporal aggregation component 304 does not yet change the frame decision 314. Rather, the temporal aggregation component 304 will not change the frame decision until a number of frames, WaitFrames, is reached. WaitFrames represents the minimum number of frames to wait before changing the decision from 1 to 0. Prior to detecting WaitFrames number of frames below the threshold, however, the scores 312 once again rise above the threshold 502 as shown at point 516. Thus, the frame decision 314 remains unchanged, resulting in the temporal aggregation component 304 smoothing over (518) rapid, but short, fluctuations in score.

When the scores 312 again drop below the threshold 502, at point 520, the temporal aggregation component 304 will wait to change the state (522) until WaitFrames number of frames below the threshold are determined. When that happens (524), the temporal aggregation component 304 will change the frame decision 314 from 1 to 0. Further, if frame scores 312 spike above the threshold for a number of frames less than MinFrames (526) (for example due to a sudden but brief noise) the temporal aggregation component 304 will reject (528) those frames and will maintain the frame decision 314 at 0. The temporal aggregation component 304 (or other component) may engage in smoothing of the frame decision 314 to avoid undesired spikes of the state. For example, the temporal aggregation component 304 may use a further threshold beyond the frame level threshold(s) to determine if a sufficient level of audio activity is detected such that the state will be altered for long enough to justify a state change. For example, if a user walks into a room where the device 110 is located and the device 110 detects the user presence for a sufficient number of frames to alter a state, if the user leaves shortly thereafter, the device 110 may determine not to change the state or not to send a presence indicator 219 since the user quickly left the location.

As shown in FIG. 3, frame decisions 314 are passed to a presence indication generator 306. The presence indication generator 306 generates a periodic presence indicator 219 which indicates the presence status at a particular point in time. The presence indication generator 306 may generate a presence indicator 219 according to a periodic schedule, for example every 5 seconds, 10 seconds, or the like. The presence indicator 219 may be a representation of the frame decision taken at a particular moment in time. For example, if at time t, the frame decision is 1, the presence indicator 219 corresponding to time t will be 1. Similarly, if at time t+30 seconds the frame decision is 1, the presence indicator 219 for time t+30 will be 1, even if the frame decision for frames t+1 through t+29 were all 0. Alternatively, the presence indicator 219 may be an average binary representation of the majority of frame decisions taken over a period of time. In the above example, the frame decision at t may be 1, but then if the frame decision for frames t+1 through t+29 were all 0, the frame decision for time t+30 will also be 0, even if the frame decision for time t+30 is 1. The presence indicator may also be calculated in other manners.

Figure 6:
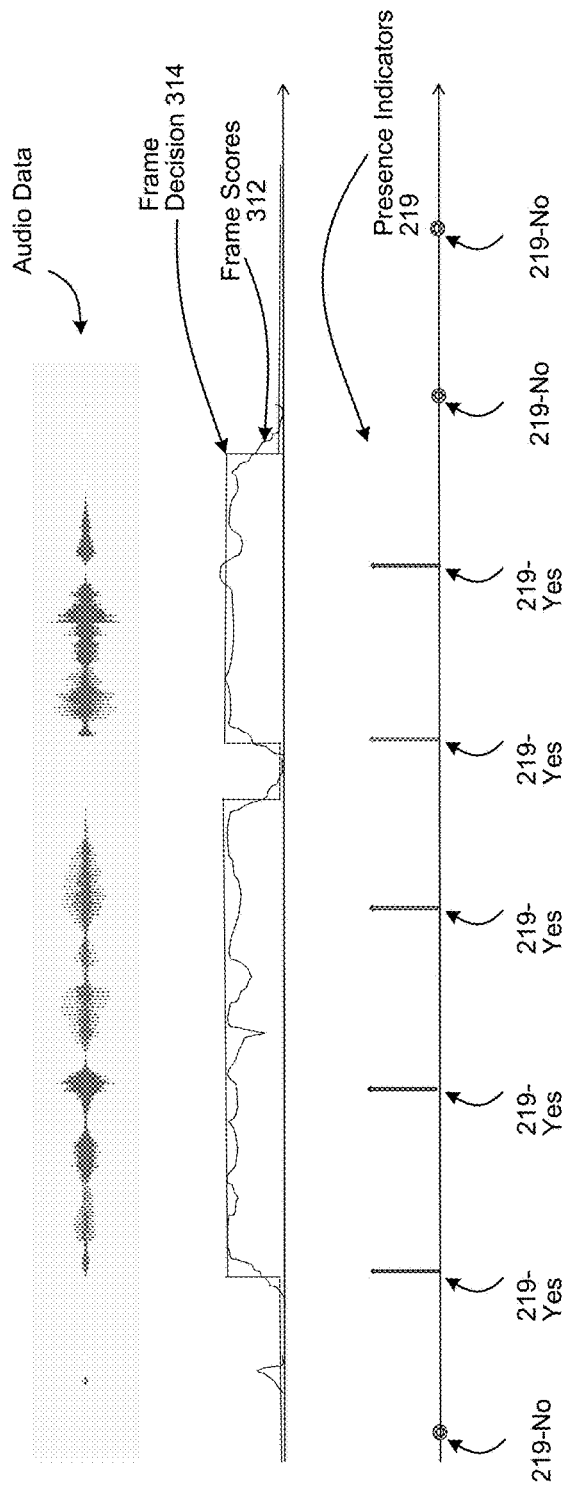
FIG. 6 illustrates smoothing and periodic presence detection by a device according to embodiments of the present disclosure.

The relationship between audio data, frame scores 312, frame decisions 314, and presence indicators 219 is shown in FIG. 6. As shown there, audio data corresponds to speech activity, during which a human is present proximate to a device. Each frame of audio is scored and charted as shown by the line for the frame scores 312. Those frame scores are smoothed to obtain the frame decision line 314, representing an alternation between state 1 (presence detected) and state 0 (no presence detected). Presence indicators 219 then indicating yes (1) or no (0) are periodically created (in the example of FIG. 6, the presence indicators 219 are snapshots of the frame decisions 314 at the particular time instance). In another example configuration, presence indicators are not sent when presence is not detected. In this configuration, the device 110 may simply not send any indicator when presence is not detected. The server 120 may thus be configured to interpret no indicator of presence as an indicator of no presence. In such a configuration a positive indicator of presence may have a decay period or other lifespan such that after a period of time of the server 120 not receiving any indicator of presence from a particular device, the server 120 will determine that no presence is detected by the particular device 110.

The presence indicators 219 may then be regularly sent over network 199 to a remote device, such as a server 120, so the server 120 may track the presence of a user near the device 110, for example using a presence monitor 980. The server 120 may use the presence monitor 980 and presence indicators 219 to track when a user is present proximate to a device 110. Assuming user permission, the presence indicators may be used for various purposes, including to notify other users when a particular user is available.

Figure 7:
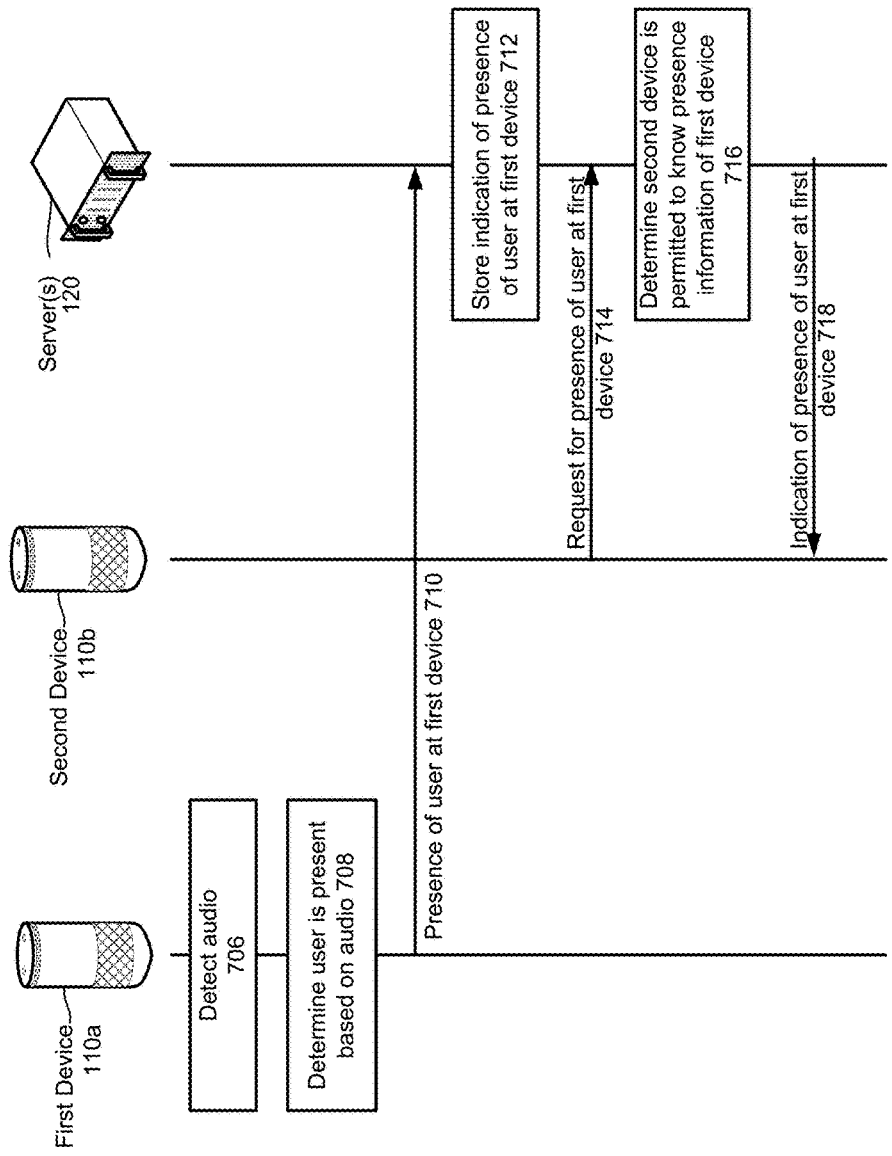
FIG. 7 illustrates communication of presence according to embodiments of the present disclosure.

An example of use of presence data is shown in FIG. 7. As shown, a first device 110a may detect (706) audio and determine (708) that a user is present based on the audio. For example the first device 110a may operate the frame scorer 302, the temporal aggregation component 304 and/or the presence indication generator 306 to create a presence indicator 219 with a value of 1. The first device 110a may then send (710) to the server 120 a second indicator of presence of a user at the first device. The server 120 may store (712) an indication of positive user presence at the first device. A second device 110b may then send (714) to the server 120 a request for whether a user is present at the first device. The server 120 may then check to determine (716) that the second device has permission to access the presence information of the first device. The server 120 may access storage (for example the user profile 804 associated with the first device) to identify the most recent indication of presence of a user of the first device (e.g., the second indicator) and may send (718) to the second device 110b an indication of presence of the a user at the first device.

While a particular device 110 may send presence indicators 219 over a network 199 to a remote device, it may also alter its operation depending on if a user is nearby. For example, if a user presence is detected as described herein, a device may power on a display 1020, may increase sensitivity levels for different components (such as the wakeword detection module 232), may increase a buffer size allocated to buffered audio, or engage in other presence related operations.

While the above focuses on presence indicators 219 being sent using a time interval based on detected audio data the presence indicators may also be based on different data, for example, image data (such as raw image data 213 or output from a CV component 222), other data 217 such as touch data, wireless communication data from a mobile device, data from a proximity detector, heat data, or the like. These different data may also be used to send their own presence indicators at configured time intervals (which may be the same or different length of time as the time intervals for presence indicators 219). Thus the system may send regular audio-based presence indicators, image-based presence indicators, some combined-data based presence indicators, or the like.

Figure 8:
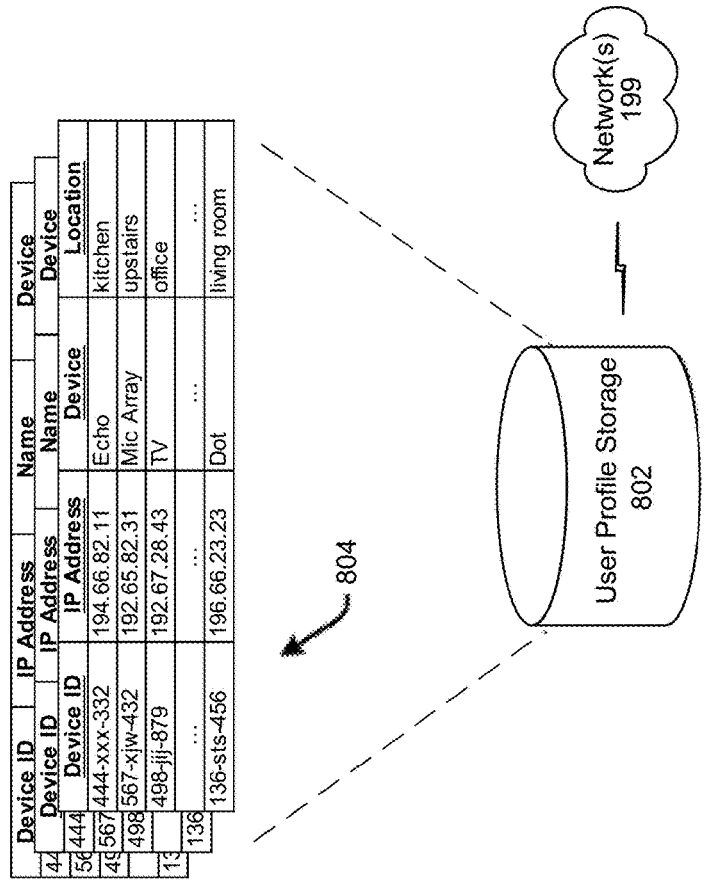
FIG. 8 illustrates data stored and associated with user profiles according to embodiments of the present disclosure.

FIG. 8 illustrates a user profile storage 802 that includes data regarding user accounts 804 as described herein. The user profile storage 802 may be located proximate to the server 120, or may otherwise be in communication with various components, for example over the network 199. The user profile storage 802 may include a variety of information related to individual users, accounts, etc. that interact with the system 100. For illustration, as shown in FIG. 8, the user profile storage 802 may include data regarding the devices associated with particular individual user accounts 804. In an example, the user profile storage 802 is a cloud-based storage. Each user profile 804 may include data such as device identifier (ID) data, speaker identifier (ID) data, voice profiles for users, internet protocol (IP) address data, name of device data, and location of device data for different devices. In addition each user profile 804 may include data regarding the locations of individual devices (including how close devices may be to each other in a home, if the device location is associated with a user bedroom, etc.), address data, or other such information. Each user profile 804 may also include presence data for one of more devices, where the presence data indicates whether a user is near the device as indicated in periodic presence indicator(s) 219 that may be received by the server 120. Each user profile 804 may also include user settings, preferences, permissions, etc. For example, a particular user profile may indicate what specific users and/or devices are permitted to access the presence information for privacy protection purposes.

Figure 9:
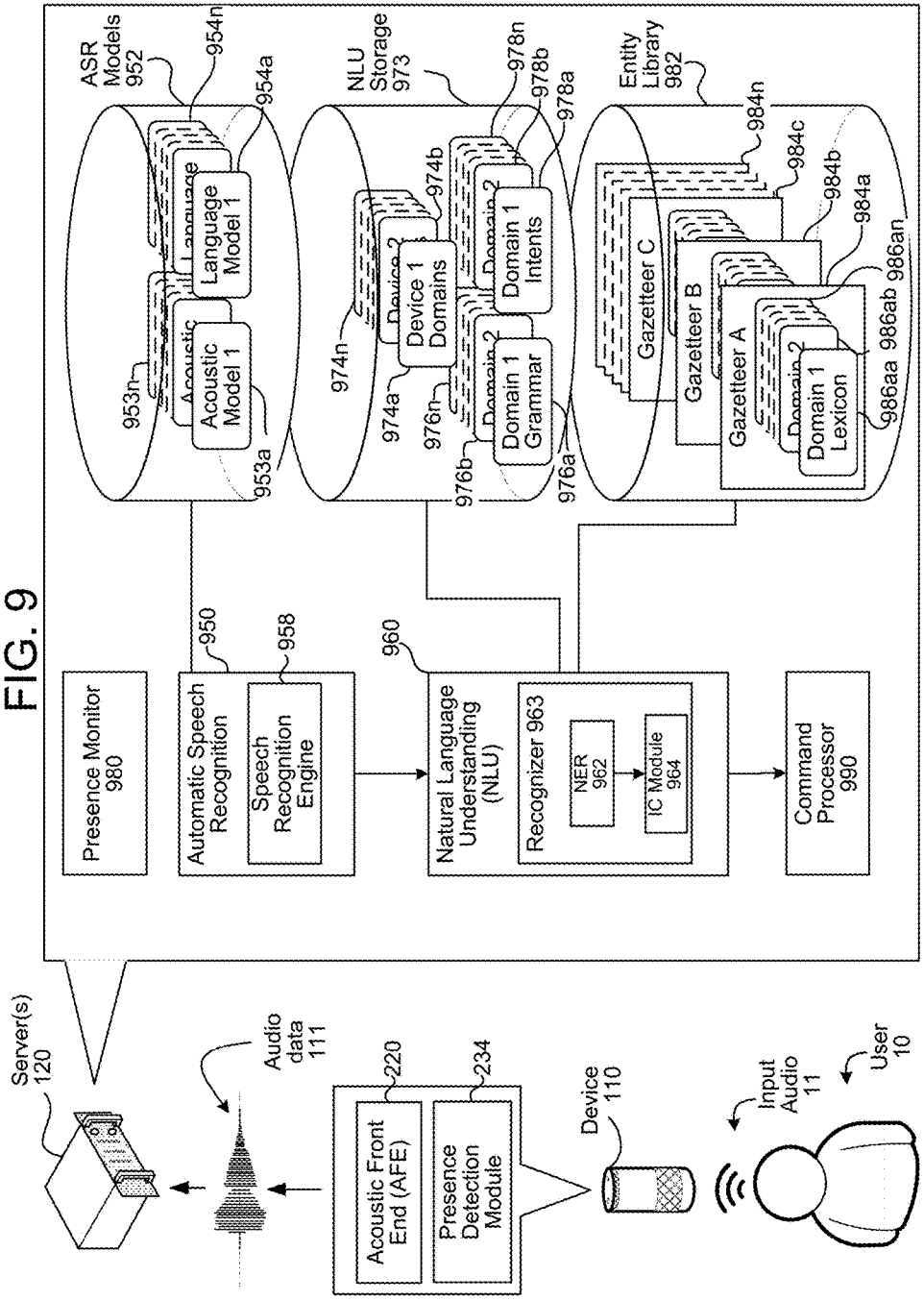
FIG. 9 is a diagram of components of speech processing system according to embodiments of the present disclosure.

Further details of the speech-processing system 100 are explained below. The system 100 of FIG. 1 may operate using various speech processing components as described in FIG. 9. FIG. 9 is a conceptual diagram of how a spoken utterance is processed. The various components illustrated may be located on a same or different physical devices. Communication between various components illustrated in FIG. 9 may occur directly or across a network 199. An audio capture component, such as the microphone of the speech-controlled device 110 (or other device), captures input audio 11 corresponding to a spoken utterance. The device 110, using a wakeword detection module 232, then processes the audio, or audio data corresponding to the audio (such as the feature vectors 215), to determine if a keyword (such as a wakeword) is detected in the audio. Following detection of a wakeword, the device sends audio data 111 corresponding to the utterance, to a server 120 that includes an ASR module 950. The audio data 111 may be output from an acoustic front end (AFE) 220 located on the device 110 prior to transmission. Or the audio data 111 may be in a different form for processing by a remote AFE 220, such as the AFE 220 located with the ASR module 950.

Upon receipt by the server(s) 120, an ASR module 950 may convert the audio data 111 into text. The ASR module 950 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 954 stored in an ASR model knowledge base (i.e., ASR model storage 952). For example, the ASR module 950 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 953 stored in the ASR model storage 952), and a likelihood that a particular word that matches the sound would be included in the sentence at the specific location (e.g., using a language model 954 stored in the ASR model storage 952). Thus, each potential textual interpretation of the spoken utterance (i.e., hypothesis) is associated with a confidence score. Based on the considered factors and the assigned confidence score, the ASR module 950 outputs the most likely text recognized in the audio data 111. The ASR module 950 may also output multiple hypotheses in the form of a lattice or an N-best list with each hypothesis corresponding to a confidence score or other score (e.g., such as probability scores, etc.).

The device or devices including the ASR module 950 may include an AFE 220 and a speech recognition engine 958. The AFE 220 may transform raw audio data 211, captured by the microphone 202, into data for processing by the speech recognition engine 958. The speech recognition engine 958 compares the speech recognition data with acoustic models 953, language models 954, and other data models and information for recognizing the speech conveyed in the audio data 111.

The speech recognition engine 958 may process data output from the AFE 220 with reference to information stored in the ASR model storage 952. Alternatively, post front-end processed data (e.g., feature vectors) may be received by the device executing ASR processing from another source besides the internal AFE 220. For example, the speech-controlled device 110 may process audio data 111 into feature vectors (e.g., using an on-device AFE 220) and transmit that information to the server 120 across the network 199 for ASR processing. Feature vectors may arrive at the server 120 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR module 950 will output speech results that make sense grammatically.

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, by the server 120, or by another device (e.g., a server running a search engine, etc.)

The device performing NLU processing 960 (e.g., server 120) may include various components, including potentially dedicated processor(s), memory, storage, etc. As shown in FIG. 9, an NLU component may include a recognizer 963 that includes a named entity recognition (NER) module 962 which is used to identify portions of query text that correspond to a named entity that may be recognizable by the system. A downstream process called named entity resolution actually links a text portion to an actual specific entity known to the system. To perform named entity resolution, the system may utilize gazetteer information (984a-984n) stored in entity library storage 982. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways. The NER module 962 (or other component) may also determine whether a word refers to an entity that is not explicitly mentioned in the utterance text, for example "him," "her," "it" or other anaphora, exophora or the like.

Generally, the NLU process takes textual input (such as processed from ASR 950 based on the utterance input audio 11) and attempts to make a semantic interpretation of the text. That is, the NLU process determines the meaning behind the text based on the individual words and then implements that meaning. NLU processing 960 interprets a text string to derive an intent or a desired action from the user as well as the pertinent pieces of information in the text that allow a device (e.g., device 110) to complete that action. For example, if a spoken utterance is processed using ASR 950 and outputs the text "call mom" the NLU process may determine that the user intended to activate a telephone in his/her device and to initiate a call with a contact matching the entity "mom" (which may involve a downstream command processor 990 linked with a telephone application).

The NLU may process several textual inputs related to the same utterance. For example, if the ASR 950 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 972.

To correctly perform NLU processing of speech input, an NLU process 960 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 962 receives a query in the form of ASR results and attempts to identify relevant grammars and lexical information that may be used to construe meaning. To do so, the NLU module 960 may begin by identifying potential domains that may relate to the received query. The NLU storage 973 includes a databases of devices (974a-974n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, Speaker ID, or Household ID, or some other indicator.

In NLU processing, a domain may represent a discrete set of activities having a common theme, such as "shopping", "music", "calendaring", etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result. This is described further in detail below in reference to FIG. 3.

An intent classification (IC) module 964 parses the query to determine an intent or intents for each identified domain, where the intent corresponds to the action to be performed that is responsive to the query. Each domain is associated with a database (978a-978n) of words linked to intents. For example, a music intent database may link words and phrases such as "quiet," "volume off," and "mute" to a "mute" intent. The IC module 964 identifies potential intents for each identified domain by comparing words in the query to the words and phrases in the intents database 978. Traditionally, the determination of an intent by the IC module is performed using a set of rules or templates that are processed against the incoming text to identify a matching intent.

In order to generate a particular interpreted response, the NER 962 applies the grammar models and lexical information associated with the respective domain to actually recognize a mention one or more entities in the text of the query. In this manner the NER 962 identifies "slots" (i.e., particular words in query text) that may be needed for later command processing. Depending on the complexity of the NER 962, it may also label each slot with a type of varying levels of specificity (such as noun, place, city, artist name, song name, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC module 964 are linked to domain-specific grammar frameworks (included in 976) with "slots" or "fields" to be filled. Each slot/field corresponds to a portion of the query text that the system believes corresponds to an entity. For example, if "play music" is an identified intent, a grammar (976) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 962 may parse the query to identify words as subject, object, verb, preposition, etc., based on grammar rules and/or models, prior to recognizing named entities. The identified verb may be used by the IC module 964 to identify intent, which is then used by the NER module 962 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 964 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 962 may search the database of generic words associated with the domain (in the knowledge base 972). So for instance, if the query was "play songs by the rolling stones," after failing to determine an album name or song name called "songs" by "the rolling stones," the NER component 962 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output data from the NLU processing (which may include tagged text, commands, etc.) may then be sent to a command processor 990, which may be located on a same or separate server 120 as part of system 100. The system 100 may include more than one command processor 990, and the destination command processor 990 may be determined based on the NLU output. For example, if the NLU output includes a command to play music, the destination command processor 990 may be a music playing application, such as one located on device 110 or in a music playing appliance, configured to execute a music playing command. If the NLU output includes a search utterance (e.g., requesting the return of search results), the command processor 990 selected may include a search engine processor, such as one located on a search server, configured to execute a search command and determine search results, which may include output text data to be processed by a text-to-speech engine and output from a device as synthesized speech.

If the NLU output includes a command to obtain content from another source, the command processor 990 or other component, through an application program interface (API), may send a request for such content to an appropriate application server or other device. The application server may send the content, for example audio content, to the command processor 990 or other component. In certain instances, the output content sent from the application server may include a link that may be sent from the server 120 to the local device 110 closest to the user (e.g., first device 110a) so that the first device 110a may use the link to access the output content desired by the user. In this case the output content data may be sent from the application server through the server 120 to the first device 110a or directly from the application server to the first device 110a (or some other destination appropriate to the command). In certain instances the output content data may be audio data (such as music, a prerecorded reading of an audio book, etc.) and thus may be output through a speaker of the local device 110. In other instances the output content data may be text data (either generated by the application server or by a component of the server(s) 120) that needs to be converted into audio data prior to being output to a user using the local device 110.

The system may also include a presence monitoring component 980, which may be located with server 120 or in a different location. This component may receive and process presence indicators 219, for example updating a user profile 804 regarding a user presence nearby a particular device, or otherwise storing/tracking presence information. If a request for presence information is received, the presence monitor 980 may process and respond to that request, for example from another user device, from a call routing command processor 990, or from some other component.

Various machine learning techniques may be used to train and operate models to perform various steps described above, such frame scoring, frame detection, presence indication generation, ASR functions, NLU functions, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 10:
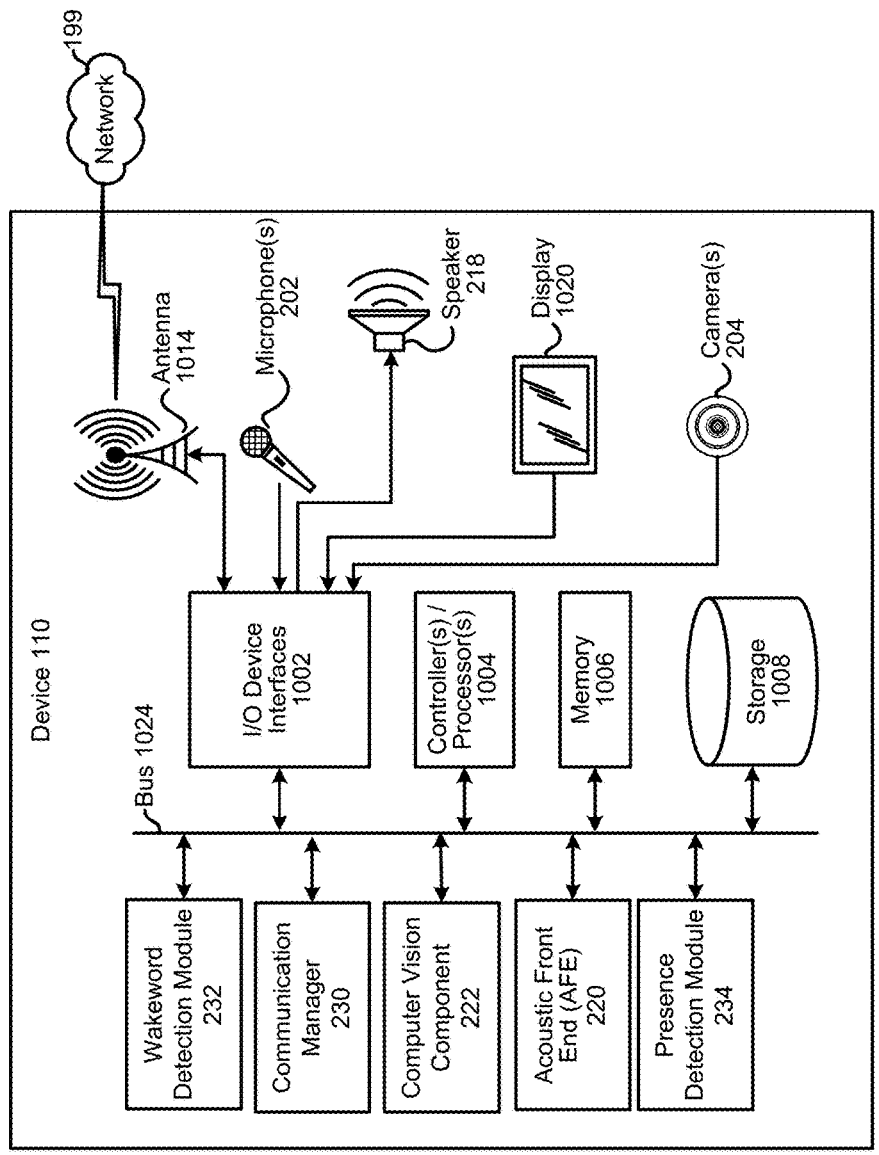
FIG. 10 is a block diagram conceptually illustrating example components of a device according to embodiments of the present disclosure.
Figure 11:
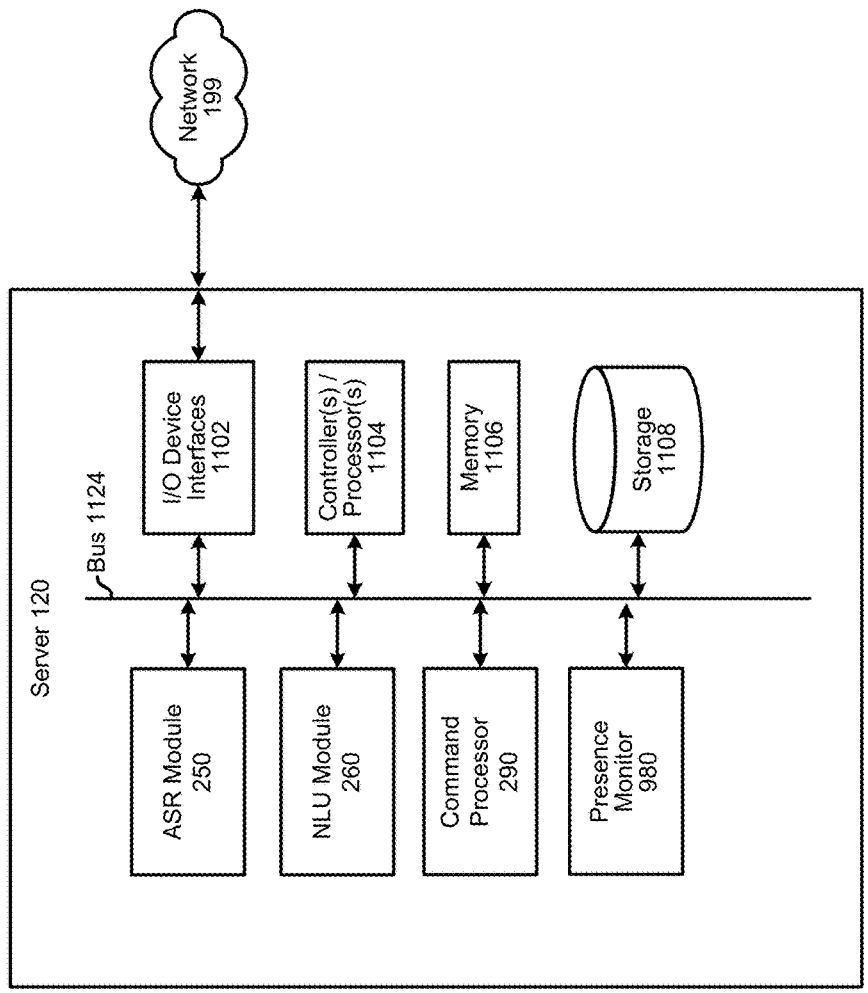
FIG. 11 is a block diagram conceptually illustrating example components of a server according to embodiments of the present disclosure.

FIG. 10 is a block diagram conceptually illustrating a user device 110 (e.g., the speech-capture device 110 described herein) that may be used with the described system. FIG. 11 is a block diagram conceptually illustrating example components of a remote device, such as the server 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1004/1104), that may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive (MRAM) and/or other types of memory. Each device (110/120) may also include a data storage component (1008/1108), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1002/1102).

Computer instructions for operating each device (110/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120) includes input/output device interfaces (1002/1102). A variety of components may be connected through the input/output device interfaces (1002/1102), as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 218, a visual output component such as a display 1020, a wired headset or a wireless headset (not illustrated), or other component capable of outputting audio. The display 1020 may output image and/or video data as described herein. The device 110 may also include an audio capture component. The audio capture component may be, for example, a microphone 202 or array of microphones, a wired headset or a wireless headset (not illustrated), etc. The microphone 202 may be configured to capture audio. If an array of microphones is included, approximate distance to a sound's point of origin may be determined by acoustic localization based on time and amplitude differences between sounds captured by different microphones of the array. Such an array may be used for far field voice detection, such as with a stationary device to be used at a home, office, or similar environment.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the speech processing system may be distributed across a networked environment.

The device 110 and/or the server 120 may include an ASR module 950. The ASR module 950 in the device 110 may be of limited or extended capabilities. The ASR module 950 may include the language models 954 stored in ASR model storage component 952. If limited speech recognition is included, the ASR module 950 may be configured to identify a limited number of words, whereas extended speech recognition may be configured to recognize a much larger range of words.

The device 110 and/or the server 120 may include a limited or extended NLU module 960. The NLU module 960 in the device 110 may be of limited or extended capabilities. The NLU module 960 may comprise the name entity recognition module 962, the intent classification module 964, and/or other components. The NLU module 960 may also include a stored knowledge base and/or entity library, or those storages may be separately located.

The device 110 and/or the server 120 may also include the command processor 990 configured to execute commands/functions associated with a spoken utterance as described herein.

The device 110 may include components such as an AFE 220, computer vision component 222, wakeword detection module 232, presence detection module 234 (which may include a frame scorer 302, temporal aggregation component 304, presence indication generator 306, etc.) or other components.

As noted above, multiple devices may be employed in a single speech processing system. In such a multi-device system, each of the devices may include different components for performing different aspects of the speech processing. The multiple devices may include overlapping components. The components of the device 110 and the server 120, as illustrated in FIGS. 10 and 11, are exemplary, and may be located as a stand-alone device or may be included, in whole or in part, as a component of a larger device or system. Further, while the device 110 is illustrated as a device primarily for interacting with a speech capture system, the device 110 may also have other functionality and components in addition to those described herein. The device 110 may be, for example, a television, wireless access point (such as a WiFi router/hub), a home appliance (such as a dishwasher, refrigerator, washing machine, dryer, etc.) or other device. Further, the components of the device 110 may be distributed among different physical devices. For example, certain components of the device 110 may be located in a television set top box, whereas the microphone of the device may be located in a remote control or in an infrared blaster device that has far field voice detection capability.

Figure 12:
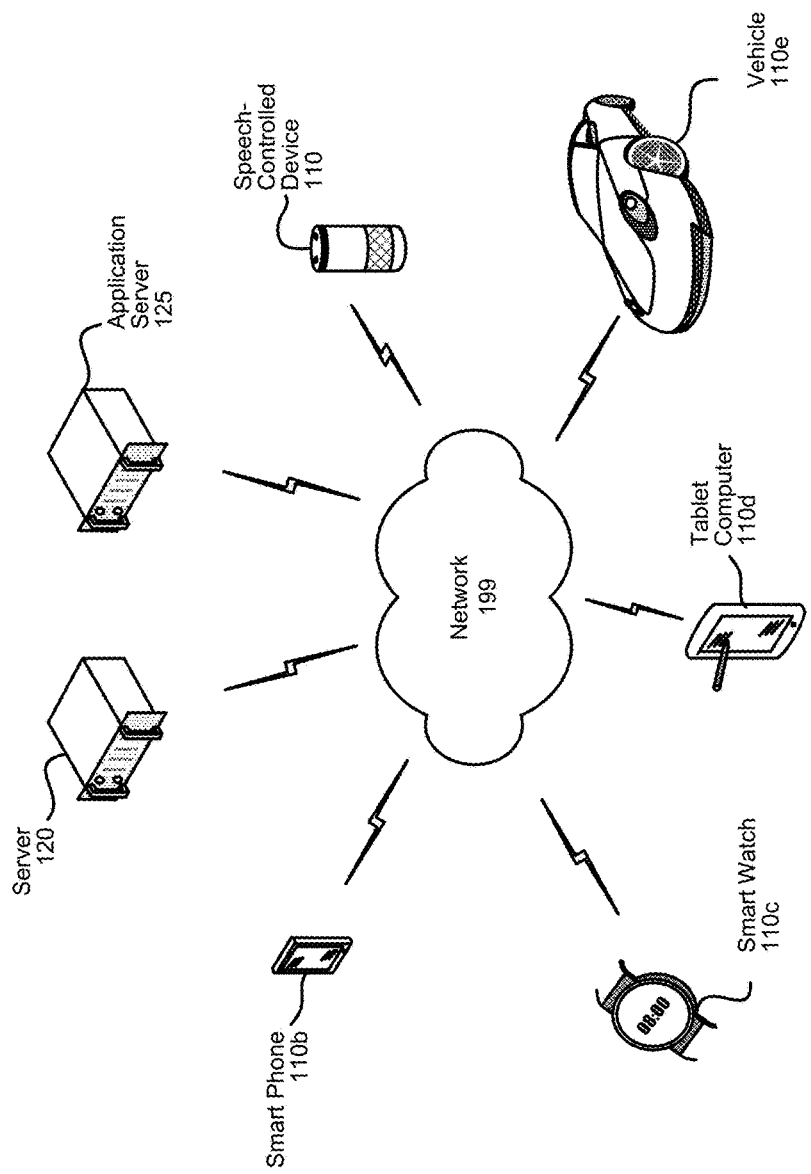
FIG. 12 illustrates an example of a computer network for use with the system.

As illustrated in FIG. 12, multiple devices (120, 110, 110b-110e) may contain components of the system 100 and the devices may be connected over a network 199. The network 199 may include a local or private network or may include a wide network such as the Internet. Devices may be connected to the network 199 through either wired or wireless connections. For example, the speech-controlled device 110, a tablet computer 110*d*, a smart phone 110*b*, a smart watch 110*c*, and/or a vehicle 110*e* may be connected to the network 199 through a wireless service provider, over a WiFi or cellular network connection, or the like. Other devices are included as network-connected support devices, such as the server 120, application developer devices (e.g., the application server 125), or others. The support devices may connect to the network 199 through a wired connection or wireless connection. Networked devices may capture audio using one-or-more built-in or connected microphones 202 or audio capture devices, with processing performed by ASR, NLU, or other components of the same device or another device connected via the network 199, such as the ASR module 950, the NLU module 960, etc. of one or more servers 120.

In one example, a plurality of devices may be located in a particular environment or otherwise be grouped together. For example, multiple devices may be in an office environment. One or more of the grouped devices may perform audio detection as described above but only one of them (or even a different device) may perform the scoring, aggregation, presence detection and/or sending of presence indicators. Thus one device in an office may send an indicator of human presence to a remote device to let the remote device know that someone is at the office. In this example, if one device detects presence, the presence information of the other devices may also update to also indicate a user is present in the environment. In another example, individual local devices may communicate presence information to each other so that one local device may tell another local device in the same environment (or in a different environment) that a user is present at the detecting device's location in the environment.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 220, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first audio data corresponding to first audio in an environment of a device;
   processing the first audio data using a deep neural network (DNN) model to determine a first score corresponding to a first audio frame of the first audio data, the first score corresponding to a likelihood that human activity was present in the environment;
   determining that the first score is above a score threshold;
   sending, at a first time, a first indicator of human presence to a remote device;
   receiving second audio data corresponding to second audio in the environment, the second audio occurring after the first audio;
   processing the second audio data using the DNN model to determine a second score corresponding to a second audio frame of the second audio data, the second score corresponding to a likelihood that human activity was present in the environment;
   determining that the second score is above the score threshold; and
   sending, at a second time, a second indicator of human presence to the remote device, the second time being a preconfigured time interval after the first time.

2. The computer-implemented method of claim 1, wherein the first audio data comprises a plurality of audio feature vectors, and the method further comprises:
   sending, to a wakeword detection component, the first audio data;

processing the first audio data using the wakeword detection component to detect a wakeword represented in the first audio data; and sending at least a portion of the first audio data to the remote device for speech processing.

3. The computer-implemented method of claim 1, further comprising:

processing the first audio data using the DNN model to determine a third score corresponding to a third audio frame of the first audio data, the third score corresponding to a likelihood that human activity was present in the environment;

determining that the third score is above the score threshold;

identifying a plurality of audio frames between the first audio frame and the third audio frame;

determining that a quantity of the plurality of audio frames have a corresponding score above the score threshold; and determining that the quantity of the plurality is above a quantity threshold.

4. The computer-implemented method of claim 1, further comprising:

receiving third audio data corresponding to third audio in the environment, the third audio occurring after the second audio;

processing the third audio data using the DNN model to determine a third score corresponding to a third audio frame of the third audio data, the third score corresponding to a likelihood that human activity was present in the environment;

determining that the third score is below the score threshold; and sending, at a third time, a third indicator to the remote device, the third indicator indicating that there is no human presence, the third time being the preconfigured time interval after the second time.

5. A device comprising:

at least one processor; and memory including instructions operable to be executed by the at least one processor to perform a set of actions to configure the device to:

receive first audio data corresponding to first audio captured by at least one microphone;

process the first audio data to determine a first score corresponding to a likelihood that human activity was present in an environment of the at least one microphone;

determine that the first score is above a score threshold;

determine a first indicator of user presence based at least in part on the first score;

send, at a first time, the first indicator of user presence to a remote device;

receive second audio data corresponding to second audio captured by the at least one microphone;

process the second audio data to determine that user presence is represented in the second audio data; and send, at a second time, a second indicator of user presence to the remote device, wherein the second time is a preconfigured time interval after the first time.

6. The device of claim 5, wherein the first audio data corresponds to a plurality of audio frames and the memory includes additional instructions operable to be executed by the at least one processor to further configure the device to:

determine the first score corresponding to a first audio frame of the plurality of audio frames.

7. The device of claim 6, wherein the memory includes additional instructions operable to be executed by the at least one processor to further configure the device to:

determine a second score corresponding to a second audio frame of the plurality of audio frames, the second score corresponding to a likelihood that human activity was present in the environment;

determine that the second score is above a score threshold;

identify a subset of audio frames between the first audio frame and the second audio frame; and determine that a majority of audio frames of the subset of audio frames correspond to a respective score above the score threshold.

8. The device of claim 7, wherein the memory includes additional instructions operable to be executed by the at least one processor to further configure the device to:

determine that a quantity of audio frames of the subset is above a quantity threshold.

9. The device of claim 5, wherein the memory includes additional instructions operable to be executed by the at least one processor to further configure the device to:

process the first audio data to determine a plurality of audio feature vectors; and send at least a portion of the plurality of audio feature vectors to the remote device for speech processing.

10. The device of claim 5, wherein the preconfigured time interval is a time interval from 30 seconds to two minutes.

11. The device of claim 5, wherein the memory includes additional instructions operable to be executed by the at least one processor to further configure the device to:

use a trained model to determine the first score.

12. The device of claim 5, wherein the first and second indicators comprise respective binary values.

13. A device, comprising:

at least one processor; and memory including instructions operable to be executed by the at least one processor to perform a set of actions to configure the device to:

receive first audio data corresponding to first audio captured by at least one microphone, process the first audio data to determine that user presence is represented in the first audio data, send, at a first time, a first indicator of user presence to a remote device, receive second audio data corresponding to second audio captured by the at least one microphone, process the second audio data to determine that user presence is represented in the second audio data, send, at a second time, a second indicator of user presence to the remote device, wherein the second time is a preconfigured time interval after the first time, and send at least a portion of the first audio data to the remote device for speech processing.

14. The device of claim 13, wherein the memory includes additional instructions operable to be executed by the at least one processor to further configure the device to:

use a trained model to determine that user presence is represented in the first audio data; and use the trained model to determine that user presence is represented in the second audio data.

15. The device of claim 13, further comprising a wakeword detection component, and wherein the first audio data comprises a plurality of audio feature vectors and the memory includes additional instructions operable to be executed by the at least one processor to further configure the device to:

send, to the wakeword detection component, the first audio data; and process the first audio data using the wakeword detection component to detect a wakeword represented in the first audio data.

16. The device of claim 13, wherein the memory includes additional instructions operable to be executed by the at least one processor to further configure the device to:

process the first audio data to determine a plurality of audio feature vectors; and send at least a portion of the plurality of audio feature vectors to the remote device for speech processing.

17. A device, comprising:

at least one processor; and memory including instructions operable to be executed by the at least one processor to perform a set of actions to configure the device to:

receive first audio data corresponding to first audio captured by at least one microphone, process the first audio data to determine that user presence is represented in the first audio data, send, at a first time, a first indicator of user presence to a remote device, receive second audio data corresponding to second audio captured by the at least one microphone, process the second audio data to determine that user presence is represented in the second audio data, send, at a second time, a second indicator of user presence to the remote device, wherein the second time is a preconfigured time interval after the first time, and wherein the preconfigured time interval is associated with a user profile corresponding to the at least one microphone.

18. The device of claim 17, wherein the memory includes additional instructions operable to be executed by the at least one processor to further configure the device to:

use a trained model to determine that user presence is represented in the first audio data; and use the trained model to determine that user presence is represented in the second audio data.

19. A computer-implemented method comprising:

receiving first audio data corresponding to first audio captured by at least one microphone;

processing the first audio data to determine a first score corresponding to a likelihood that human activity was present in an environment of the at least one microphone;

determining that the first score is above a score threshold;

determining a first indicator of user presence based at least in part on the first score;

sending, at a first time, the first indicator of user presence to a remote device;

receiving second audio data corresponding to second audio captured by the at least one microphone;

processing the second audio data to determine that user presence is represented in the second audio data; and sending, at a second time, a second indicator of user presence to the remote device, wherein the second time is a preconfigured time interval after the first time.

20. The computer-implemented method of claim 19, wherein the first audio data corresponds to a plurality of audio frames and determining the first score further comprises:

determining the first score corresponding to a first audio frame of the plurality of audio frames.

21. The computer-implemented method of claim 20, further comprising:

determining a second score corresponding to a second audio frame of the plurality of audio frames, the second score corresponding to a likelihood that human activity was present in the environment;

determining that the second score is above a score threshold;

identifying a subset of audio frames between the first audio frame and the second audio frame; and determining that a majority of audio frames of the subset of audio frames correspond to a respective score above the score threshold.

22. The computer-implemented method of claim 21, further comprising:

determining that a quantity of audio frames of the subset is above a quantity threshold.

23. The computer-implemented method of claim 19, further comprising:

processing the first audio data to determine a plurality of audio feature vectors; and sending at least a portion of the plurality of audio feature vectors to the remote device for speech processing.

24. The computer-implemented method of claim 19, wherein the preconfigured time interval is a time interval from 30 seconds to two minutes.

25. The computer-implemented method of claim 19, wherein:

processing the first audio data further comprises using a trained model to determine the first score.

26. A computer-implemented method, comprising:

receiving first audio data corresponding to first audio captured by at least one microphone;

sending at least a portion of the first audio data to a remote device for speech processing;

processing the first audio data to determine that user presence is represented in the first audio data;

sending, at a first time, a first indicator of user presence to a remote device;

receiving second audio data corresponding to second audio captured by the at least one microphone;

processing the second audio data to determine that user presence is represented in the second audio data;

sending, at a second time, a second indicator of user presence to the remote device, wherein the second time is a preconfigured time interval after the first time.

27. The computer-implemented method of claim 26, wherein the first audio data comprises a plurality of audio feature vectors, and the method further comprises:

sending, to a wakeword detection component, the first audio data; and processing the first audio data using the wakeword detection component to detect a wakeword represented in the first audio data.

28. The computer-implemented method of claim 26, further comprising:

processing the first audio data to determine a plurality of audio feature vectors; and sending at least a portion of the plurality of audio feature vectors to the remote device for speech processing.

29. The computer-implemented method of claim 26, wherein:

processing the first audio data further comprises using a trained model to determine that user presence is represented in the first audio data; and processing the second audio data further comprises using the trained model to determine that user presence is represented in the second audio data.

30. A computer-implemented method, comprising:
receiving first audio data corresponding to first audio captured by at least one microphone;
processing the first audio data to determine that user presence is represented in the first audio data;
sending, at a first time, a first indicator of user presence to a remote device;
receiving second audio data corresponding to second audio captured by the at least one microphone;
processing the second audio data to determine that user presence is represented in the second audio data; and
sending, at a second time, a second indicator of user presence to the remote device, wherein the second time is a preconfigured time interval after the first time, and wherein the preconfigured time interval is associated with a user profile corresponding to the at least one microphone.

31. The computer-implemented method of claim 30, wherein:
processing the first audio data further comprises using a trained model to determine that user presence is represented in the first audio data; and
processing the second audio data further comprises using the trained model to determine that user presence is represented in the second audio data.

* * * * *